US011390993B2

(12) United States Patent
Yamada (10) Patent No.: US 11,390,993 B2
(45) Date of Patent: Jul. 19, 2022

(54) HOPPER AND CUTTING PROCESS DEVICE

(71) Applicant: SEIKO EPSON CORPORATION, Tokyo (JP)

(72) Inventor: Kentaro Yamada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 119 days.

(21) Appl. No.: 16/727,084

(22) Filed: Dec. 26, 2019

(65) Prior Publication Data

US 2020/0208348 A1     Jul. 2, 2020

(30) Foreign Application Priority Data

Dec. 28, 2018   (JP) .............................. JP2018-247584

(51) Int. Cl.
*D21F 9/00* (2006.01)
*D21F 7/00* (2006.01)

(52) U.S. Cl.
CPC ................ *D21F 9/00* (2013.01); *D21F 7/006* (2013.01)

(58) Field of Classification Search
CPC ........ A01C 15/006; B65G 3/04; B65G 47/18; B65G 47/19; B65G 47/20; B65G 47/44; B65G 65/30; B65G 65/32; B26D 7/0641; B65D 88/26; B65D 88/28; B65D 88/30; B65D 88/54; B65D 88/58; B65D 88/60; B65D 88/62; D21F 7/006; D21F 9/00; D21B 1/10
USPC .................................. 162/191, 197, 270, 271
See application file for complete search history.

(56) References Cited

U.S. PATENT DOCUMENTS

| 4,826,062 | A | * | 5/1989 | Buob | .................... | A01B 69/022 |
| | | | | | | 225/2 |
| 5,137,172 | A | * | 8/1992 | Wagner | ................... | B65B 25/08 |
| | | | | | | 221/26 |
| 10,100,466 | B2 | | 10/2018 | Gomi et al. | | |

FOREIGN PATENT DOCUMENTS

| JP | 11-229284 A | 8/1999 |
| JP | 2016-163944 A | 9/2016 |

* cited by examiner

*Primary Examiner* — Eric Hug
(74) *Attorney, Agent, or Firm* — Global IP Counselors, LLP (57) ABSTRACT

A hopper includes a receiving member having a guide surface that guides a non-flat strip-shaped sheet and a posture adjusting unit that adjusts a posture of the falling sheet and sends it to the guide surface, and a discharge unit that discharges the sheet. The posture adjusting unit may have a posture adjusting surface continuous with the guide surface and bent from the guide surface so as to form a ridge line at a boundary portion with the guide surface.

8 Claims, 8 Drawing Sheets

HOPPER AND CUTTING PROCESS DEVICE

The present application is based on, and claims priority from JP Application Serial Number 2018-247584, filed Dec. 28, 2018, the disclosure of which is hereby incorporated by reference herein in its entirety.

BACKGROUND

1. Technical Field

The present disclosure relates to a hopper and a cutting process device.

2. Related Art

In recent years, environmental awareness has increased, and it has been demanded not only to reduce the amount of paper used, but also to recycle used paper.

As an apparatus for performing such reproduction, for example, a configuration having a crushing unit for crushing used paper, a defibrating unit for defibrating coarse debris, a separation unit that separates foreign substances from defibrated material defibrated at the defibrating unit, a forming unit for depositing defibrated material from which foreign substances are removed and forming the deposits into a sheet can be employed. With this apparatus, the used paper can be reused as recycled paper.

Such an apparatus is provided with a hopper that receives used paper or sheet cut in the crushing unit and the forming unit, and the received paper or sheet hopper is collected by the hopper and transported downstream.

As shown in JP-A-11-229284, for example, a hopper having a shape with a receiving portion that expands upward in the vertical direction is common. The falling paper scraps are collected by the receiving portion and are guided to a discharge port of the bottom portion.

However, depending on the shape of the paper scraps falling on the receiving portion, the paper scraps may remain at the entrance of the discharge port, and paper jam may occur.

SUMMARY

The present disclosure can be realized in the following aspects.

According to an aspect of the present disclosure, there is provided a hopper including a receiving member having a guide surface that guides a non-flat strip-shaped sheet and a posture adjusting unit that adjusts a posture of the falling sheet and sends the sheet to the guide surface, and a discharge unit that discharges the sheet.

According to another aspect of the present disclosure, there is provided a hopper including a first side wall, a second side wall disposed so as to face the first side wall, a third side wall coupled to the first side wall and the second side wall, a fourth side wall coupled to the first side wall and the second side wall so as to face the third side wall, an opening portion provided on one side having a distance between the first side wall and the second side wall, and a discharge port provided on the other side such that the first side wall is inclined and a distance between the first side wall from the opening portion and the second side wall is shorter than that of the opening portion. An inclined surface having an inclination different from that of the first side wall is coupled to the first side wall, and the inclined surface is provided between the opening portion and the discharge port.

According to still another aspect of the present disclosure, there is provided a cutting process device including a cutting unit that cuts a sheet base material to form a non-flat strip-shaped sheet and the hopper of the present disclosure. The hopper is installed at a position in which the sheet formed by the cutting unit falls and one end portion of the fallen sheet abuts on the posture adjusting unit.

DESCRIPTION OF EXEMPLARY EMBODIMENTS

Hereinafter, a hopper and a cutting process device of the present disclosure will be described in detail based on preferred embodiments shown in the accompanying drawings.

First Embodiment

Figure 1:
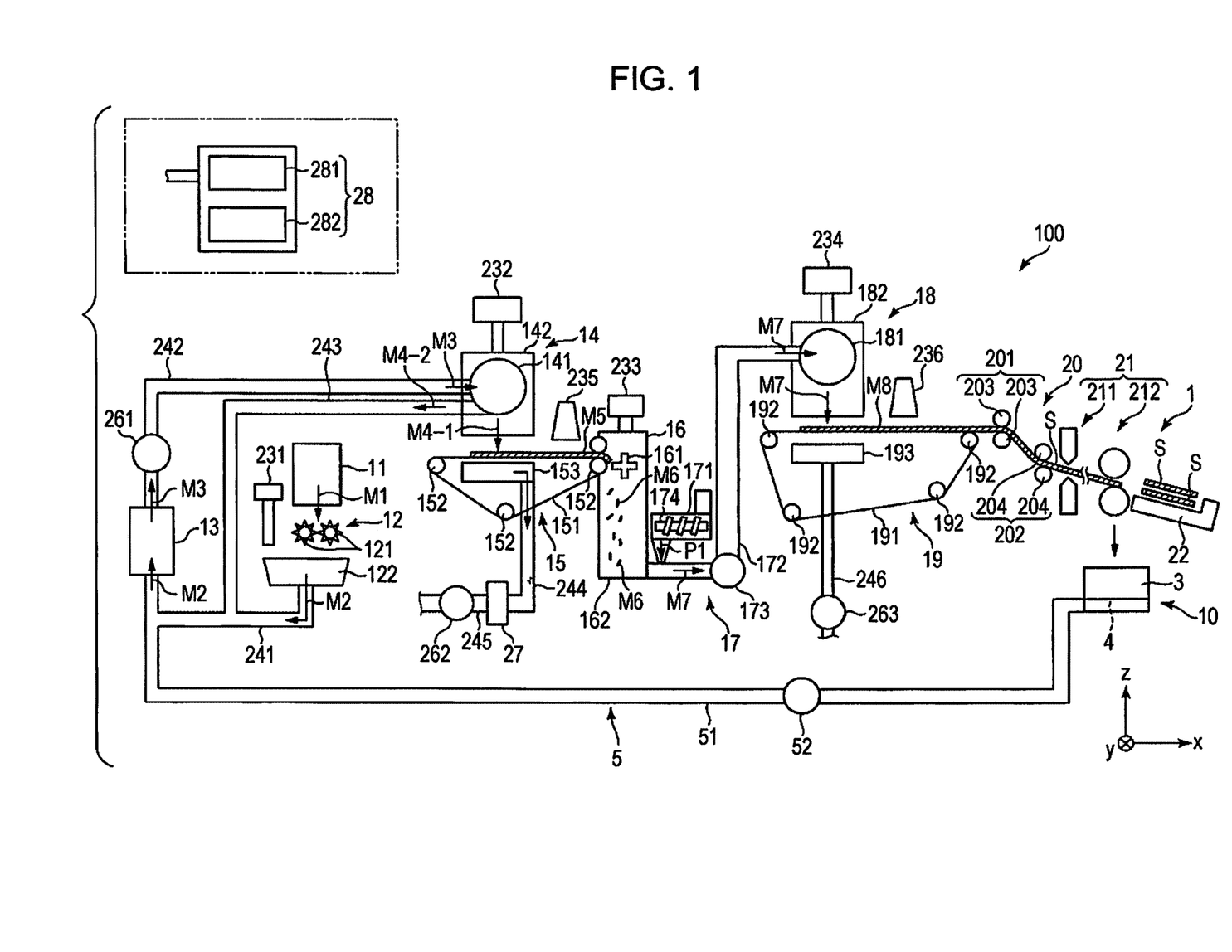
FIG. 1 is a schematic side surface view showing a sheet manufacturing apparatus including a first embodiment of a cutting process device of the present disclosure.
Figure 2:
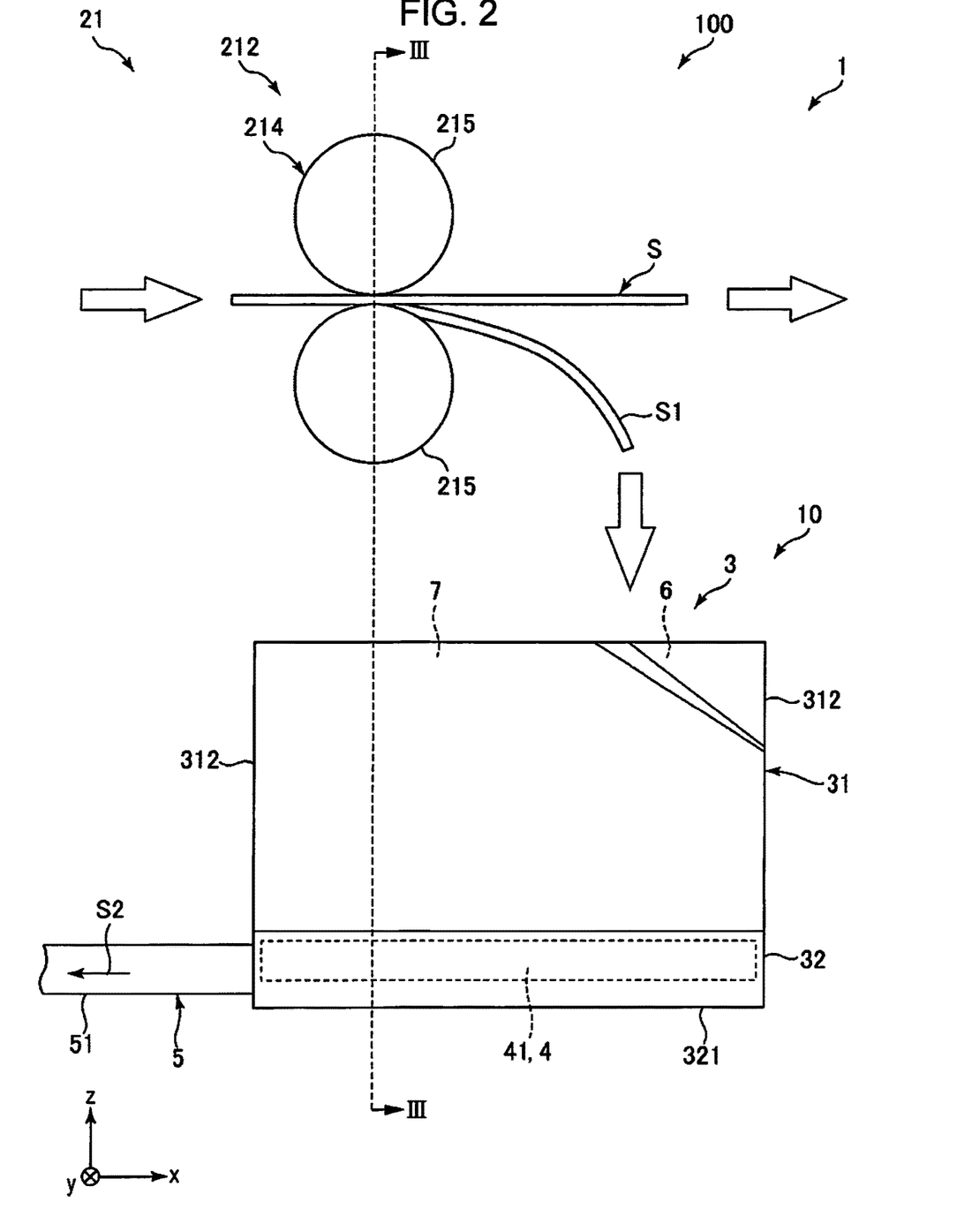
FIG. 2 is a side view of the cutting process device shown in FIG. 1.
Figure 3:
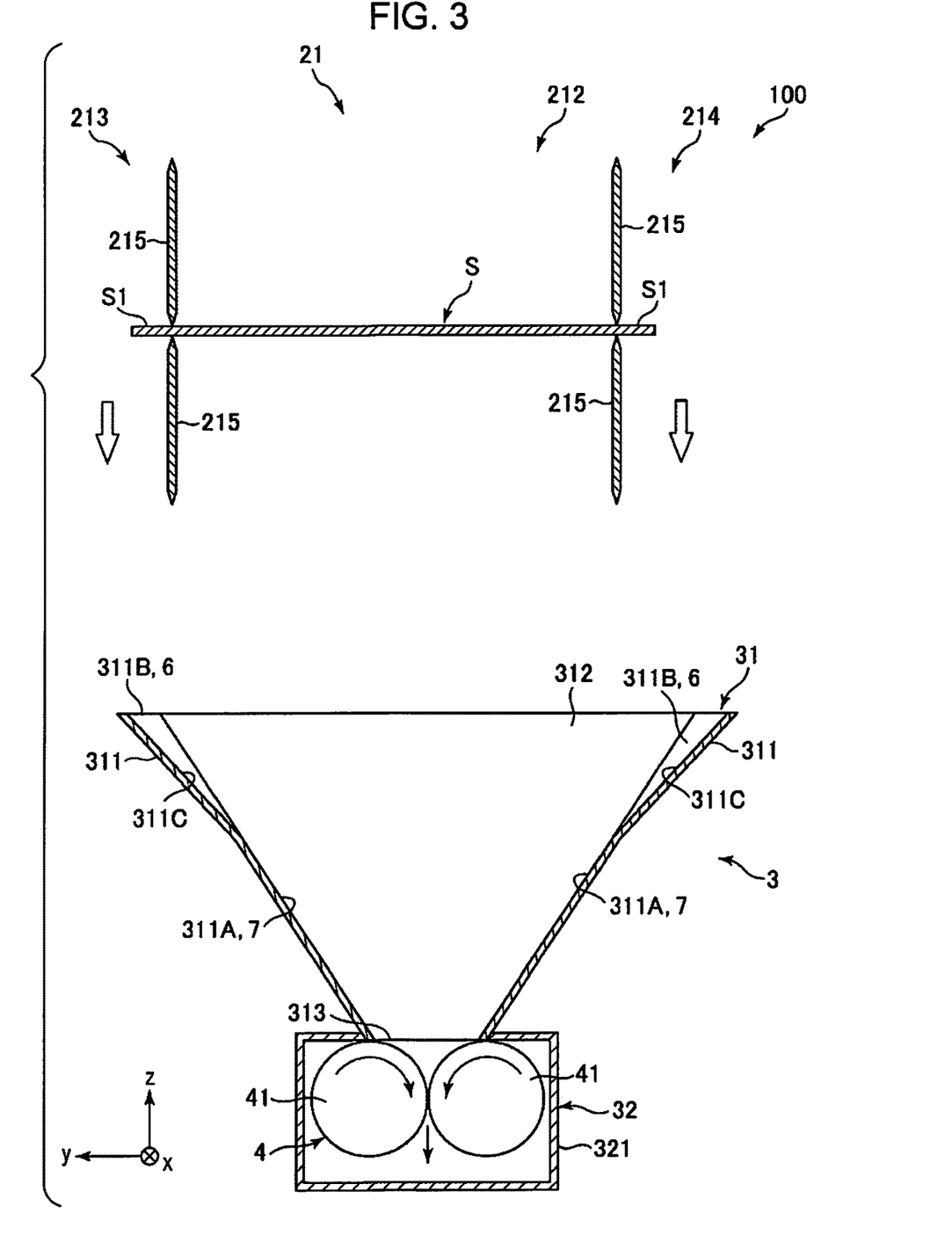
FIG. 3 is a cross-sectional view taken along line III-III in FIG. 2.
Figure 4:
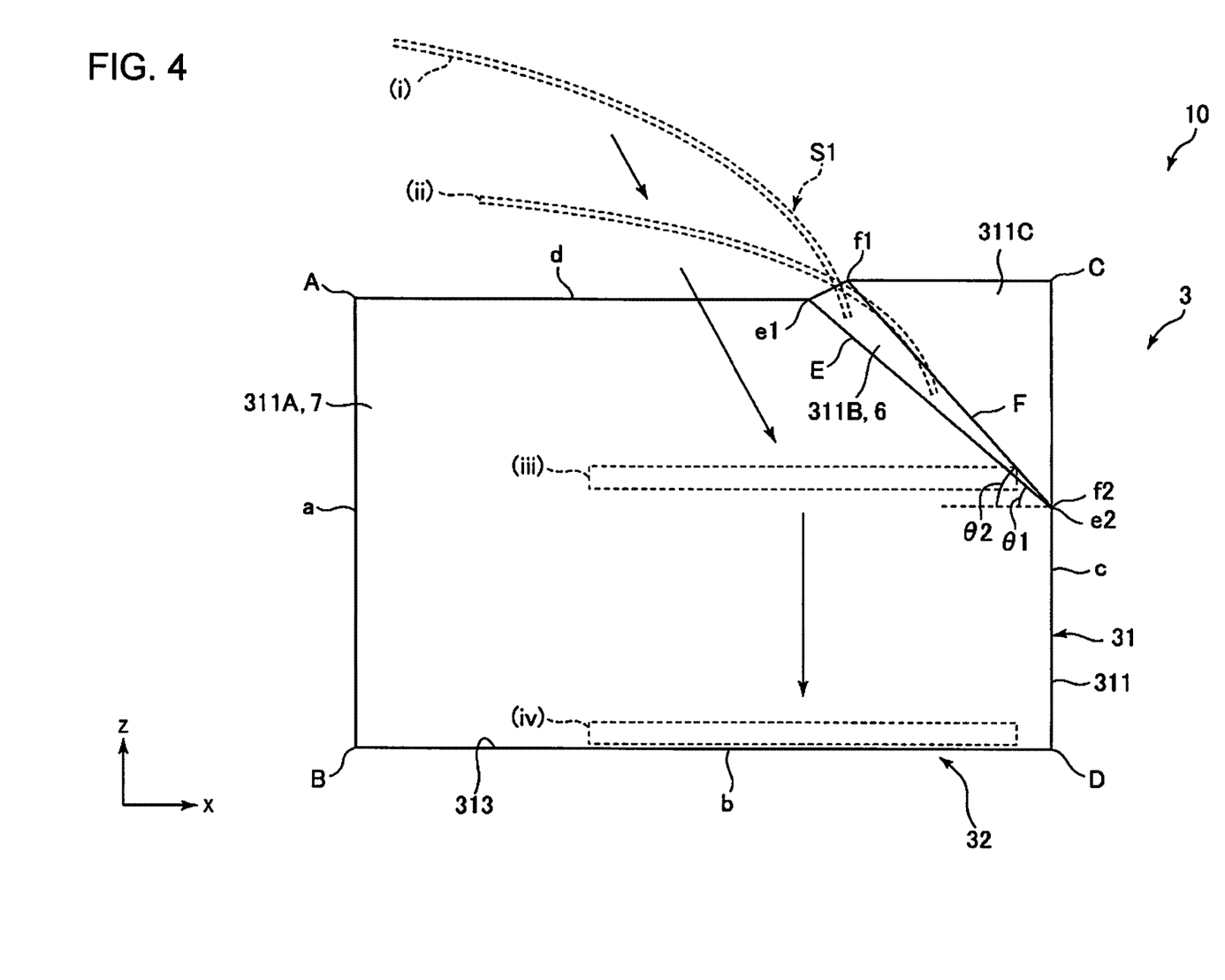
FIG. 4 is a plan view of a guide plate provided in the hopper of the present disclosure shown in FIG. 2.
Figure 5:
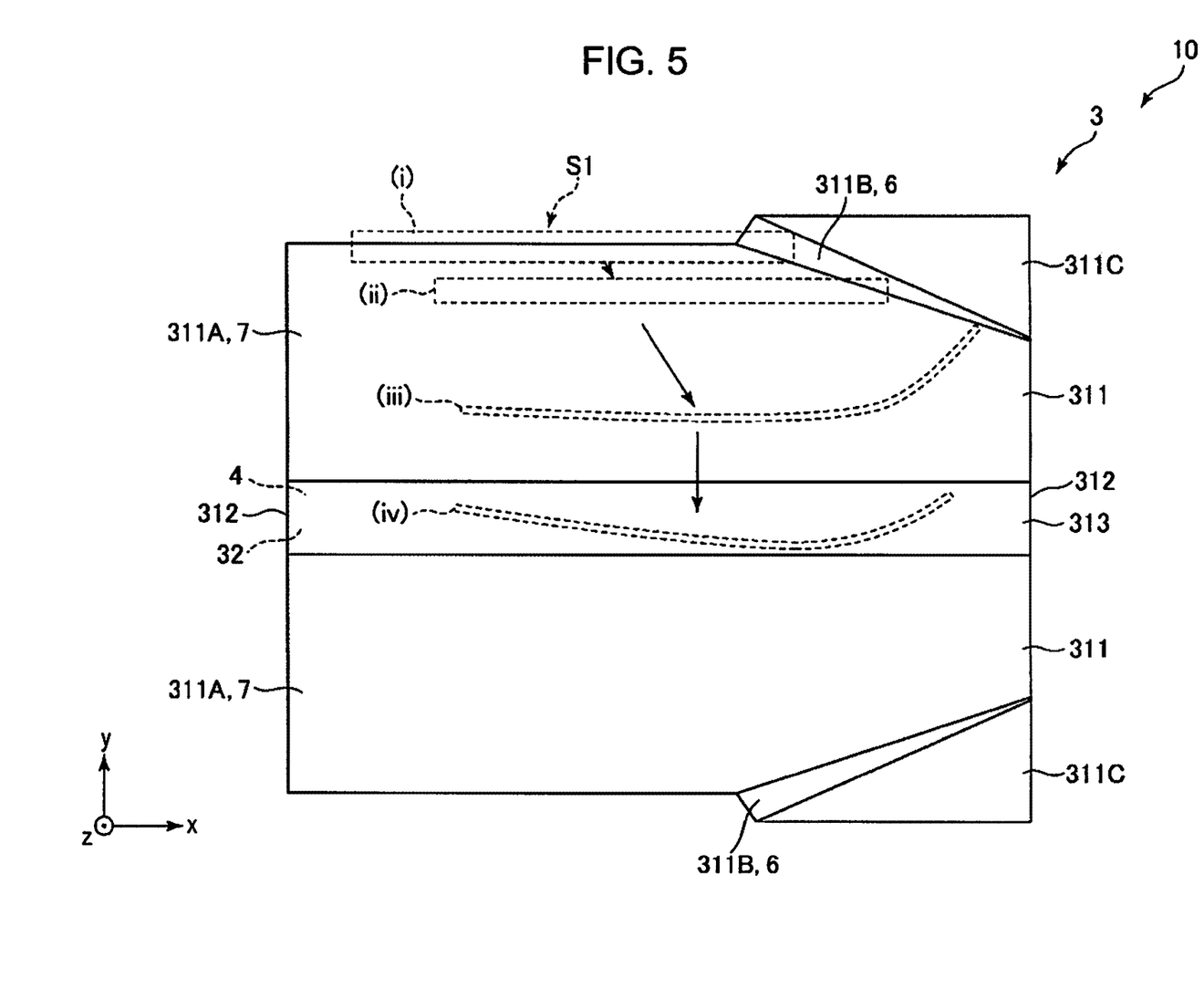
FIG. 5 is a view of the hopper of the present disclosure shown in FIG. 4 as viewed from above in the vertical direction.
Figure 6:
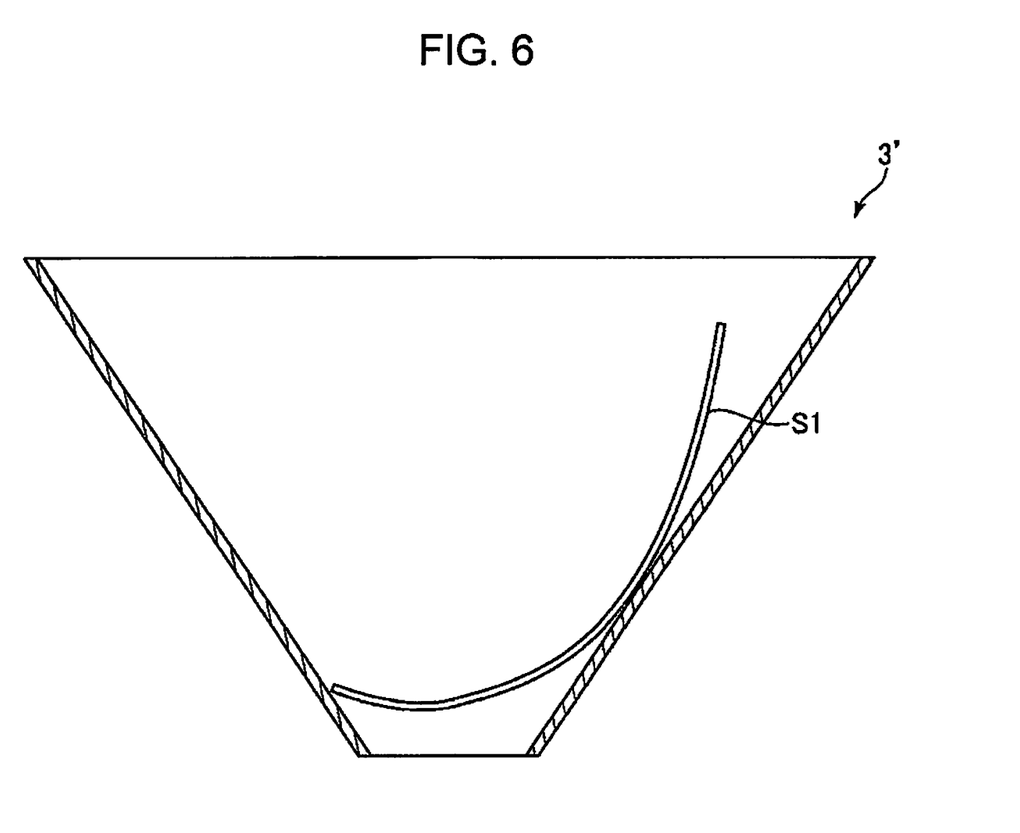
FIG. 6 is a cross-sectional view in which a hopper in the related art is applied to a sheet manufacturing apparatus.

FIG. 1 is a schematic side surface view showing a sheet manufacturing apparatus including a first embodiment of a cutting process device of the present disclosure. FIG. 2 is a side view of the cutting process device shown in FIG. 1. FIG. 3 is a cross-sectional view taken along line III-III in FIG. 2. FIG. 4 is a plan view of a guide plate provided in the hopper of the present disclosure shown in FIG. 2. FIG. 5 is a view of the hopper of the present disclosure shown in FIG. 4 as viewed from above in the vertical direction. FIG. 6 is a cross-sectional view in which a hopper in the related art is applied to a sheet manufacturing apparatus.

In the following, for convenience of explanation, as shown in FIGS. 1 to 5, three axes orthogonal to each other are referred to as an x axis, a y axis, and a z axis. The xy plane including the x axis and the y axis is horizontal, and the z axis is vertical. The direction in which the arrow of each axis points is called "+", and the opposite direction is called "−". Also, the upper side of FIGS. 1 to 3 may be referred to as "upper" or "above", and the lower side may be referred to as "lower" or "below".

As shown in FIG. 1, a sheet manufacturing apparatus 100 includes a raw material supply unit 11, a crushing unit 12, a defibrating unit 13, a sorting unit 14, a first web forming unit 15, a subdividing unit 16, a mixing unit 17, a loosening unit 18, a second web forming unit 19, a sheet forming unit 20, a cutting unit 21, a stock unit 22, a collection unit 27, a control unit 28, and a collection unit 10 provided with a hopper 3 of the present disclosure. Each of these units is electrically coupled to the control unit 28, and the operation thereof is controlled by the control unit 28.

The sheet manufacturing apparatus 100 includes a humidifying unit 231, a humidifying unit 232, a humidifying unit 233, a humidifying unit 234, a humidifying unit 235, and a humidifying unit 236. In addition, the sheet manufacturing apparatus 100 includes a blower 261, a blower 262, and a blower 263.

In the sheet manufacturing apparatus 100, a raw material supply process, a crushing process, a defibrating process, a sorting process, a first web forming process, a dividing process, a mixing process, a loosening process, a second web forming process, a sheet forming process, and a cutting process are executed in this order.

Hereinafter, the configuration of each unit will be described.

The raw material supply unit 11 is a portion that performs a raw material supply process of supplying a raw material M1 to the crushing unit 12. The raw material M1 is a sheet-like material made of a fiber-containing material containing a cellulose fiber. The cellulose fiber may be any fibrous material containing cellulose as a main compound, and may contain hemicellulose and lignin in addition to cellulose. The form of the raw material M1 is not limited, such as woven fabric or non-woven fabric. The raw material M1 may be, for example, recycled paper recycled and manufactured by defibrating used paper, synthetic paper YUPO paper (registered trademark), or not recycled paper. In the present embodiment, the raw material M1 is used paper which is used or unnecessary.

The crushing unit 12 is a portion that performs a crushing process of crushing the raw material M1 supplied from the raw material supply unit 11 in the air such as the atmosphere. The crushing unit 12 has a pair of crushing blades 121 and a chute 122.

The pair of crushing blades 121 rotate in the opposite direction to each other so that the raw material M1 therebetween can be crushed, that is, cut into coarse debris M2. The shape and size of the coarse debris M2 are preferably suitable for the defibrating process in the defibrating unit 13. For example, a small piece having a side length 100 mm or less is preferable, and a small piece having a length of 10 mm or more and 70 mm or less is more preferable.

The chute 122 is disposed below the pair of crushing blades 121 and has, for example, a funnel shape. Thereby, the chute 122 can receive the coarse debris M2 crushed and dropped by the crushing blade 121.

The humidifying unit 231 is disposed adjacent to the pair of crushing blades 121 above the chute 122. The humidifying unit 231 humidifies the coarse debris M2 in the chute 122. The humidifying unit 231 is configured of a hot air vaporizing type humidifier which has a filter (not shown) containing moisture and supplies humidified air with increased humidity to the coarse debris M2 by passing air through the filter. By supplying the humidified air to the coarse debris M2, it is possible to suppress the coarse debris M2 from adhering to the chute 122 and the like due to static electricity.

The chute 122 is coupled to the defibrating unit 13 via a pipe 241. The coarse debris M2 collected in the chute 122 is passed through the pipe 241 and is transported to the defibrating unit 13.

The defibrating unit 13 is a portion that performs a defibrating process of defibrating the coarse debris M2 in the air, that is, dry. By the defibrating process in the defibrating unit 13, a defibrated material M3 can be generated from the coarse debris M2. Here "defibrating" means unraveling the coarse debris M2 formed by binding a plurality of fibers into individual fibers. Then, the unraveled material becomes the defibrated material M3. The shape of the defibrated material M3 is linear or strip-shaped. Moreover, the defibrated materials M3 may exist in a state in which they are intertwined into a lump.

In the present embodiment, for example, the defibrating unit 13 is configured of an impeller mill having a rotary blade that rotates at a high speed and a liner that is located on the outer periphery of the rotary blade. The coarse debris M2 flowed into the defibrating unit 13 is sandwiched between the rotary blade and the liner and defibrated.

The defibrating unit 13 can generate a flow of air from the crushing unit 12 toward the sorting unit 14, that is, an airflow, by rotation of the rotary blade. Thereby, the coarse debris M2 can be sucked into the defibrating unit 13 from the pipe 241. After the defibrating process, the defibrated material M3 can be sent out to the sorting unit 14 via a pipe 242.

The blower 261 is installed in the middle of the pipe 242. The blower 261 is an airflow generator that generates an airflow toward the sorting unit 14. Thereby, the delivery of the defibrated material M3 to the sorting unit 14 is promoted.

The sorting unit 14 is a portion that performs a sorting process of sorting the defibrated material M3 according to the length of the fibers. In the sorting unit 14, the defibrated material M3 is sorted into a first sorted item M4-1 and a second sorted item M4-2 longer than the first sorted item M4-1. The first sorted item M4-1 has a size suitable for the subsequent manufacture of the sheet S. The average length is preferably 1 µm or more and 30 µm or less. On the other hand, the second sorted item M4-2 includes, for example, those in which defibration is insufficient or those in which defibrated fibers are excessively aggregated.

The sorting unit 14 has a drum unit 141 and a housing unit 142 that houses the drum unit 141.

The drum unit 141 is a sieve that is formed of a cylindrical mesh body and rotates about its central axis. The defibrated material M3 flows into the drum unit 141. By rotating the drum unit 141, the defibrated material M3 smaller than the mesh opening of the net is sorted as the first sorted item M4-1, and the defibrated material M3 larger than the mesh opening of the net is sorted as the second sorted item M4-2.

The first sorted item M4-1 falls from the drum unit 141.

On the other hand, the second sorted item M4-2 is sent out to a pipe 243 coupled to the drum unit 141. The pipe 243 is coupled to the pipe 241 on the opposite side of the drum unit 141, that is, on the downstream. The second sorted item M4-2 passed through the pipe 243 merges with the coarse debris M2 in the pipe 241 and flows into the defibrating unit 13 with the coarse debris M2. Thereby, the second sorted item M4-2 is returned to the defibrating unit 13 and is subjected to the defibrating process with the coarse debris M2.

The first sorted item M4-1 fallen from the drum unit 141 falls while being dispersed in the air and travels toward the first web forming unit 15 located below the drum unit 141. The first web forming unit 15 is a portion that performs a first web forming process of forming a first web M5 from the first sorted item M4-1. The first web forming unit 15 has a mesh belt 151, three stretching rollers 152, and a suction unit 153.

The mesh belt 151 is an endless belt, and the first sorted item M4-1 is deposited thereon. The mesh belt 151 is wound around the three stretching rollers 152. Then, the first sorted item M4-1 on the mesh belt 151 is transported downstream by the rotational drive of the stretching roller 152.

The first sorted item M4-1 has a size larger than the mesh opening of the mesh belt 151. Thereby, the first sorted item M4-1 is restricted from passing through the mesh belt 151 and can be deposited on the mesh belt 151. Since the first sorted item M4-1 is deposited on the mesh belt 151 and is transported downstream along with the mesh belt 151, it is formed as a layered first web M5.

For example, dust and dirt may be mixed in the first sorted item M4-1. Dust and dirt may be generated by crushing or defibration, for example. Such dust and dirt are collected in the collection unit 27 described later.

The suction unit 153 is a suction mechanism that sucks air from below the mesh belt 151. Thereby, dust and dirt passed through the mesh belt 151 can be sucked together with air.

The suction unit 153 is coupled to the collection unit 27 via a pipe 244. The dust and dirt sucked by the suction unit 153 are collected by the collection unit 27.

A pipe 245 is further coupled to the collection unit 27. Moreover, the blower 262 is installed in the middle of the pipe 245. By the operation of the blower 262, a suction force can be generated in the suction unit 153. Thereby, the formation of the first web M5 on the mesh belt 151 is promoted. The first web M5 is one from which dust and dirt and the like are removed. Moreover, dust and dirt pass through the pipe 244 and reach the collection unit 27 by the operation of the blower 262.

The housing unit 142 is coupled to the humidifying unit 232. The humidifying unit 232 is configured of a vaporizing humidifier similar to the humidifying unit 231. Thereby, humidified air is supplied into the housing unit 142. The humidified air can humidify the first sorted item M4-1, and it is possible to suppress the first sorted item M4-1 from adhering to the inner wall of the housing unit 142 due to electrostatic force.

The humidifying unit 235 is disposed at the downstream of the sorting unit 14. The humidifying unit 235 is configured of an ultrasonic humidifier that sprays water. Thereby, moisture can be supplied to the first web M5, and the moisture content of the first web M5 is adjusted. By the adjustment, the adsorption of the first web M5 to the mesh belt 151 due to electrostatic force can be suppressed. Thereby, the first web M5 is easily peeled off from the mesh belt 151 at a position where the mesh belt 151 is folded back by the stretching roller 152.

The subdividing unit 16 is disposed at the downstream of the humidifying unit 235. The subdividing unit 16 is a portion that performs a dividing process of dividing the first web M5 peeled off from the mesh belt 151. The subdividing unit 16 has a propeller 161 that is rotatably supported and a housing unit 162 that houses the propeller 161. The first web M5 can be divided by the rotating propeller 161. The divided first web M5 becomes a subdivided body M6. Moreover, the subdivided body M6 descends in the housing unit 162.

The housing unit 162 is coupled to the humidifying unit 233. The humidifying unit 233 is configured of a vaporizing humidifier similar to the humidifying unit 231. Thereby, humidified air is supplied into the housing unit 162. The humidified air can also suppress the subdivided body M6 from adhering to the propeller 161 and the inner wall of the housing unit 162 due to electrostatic force.

The mixing unit 17 is disposed at the downstream of the subdividing unit 16. The mixing unit 17 is a portion that performs a mixing process of mixing the subdivided body M6 and a resin P1. The mixing unit 17 has a resin supply unit 171, a pipe 172, and a blower 173.

The pipe 172 couples the housing unit 162 of the subdividing unit 16 and a housing unit 182 of the loosening unit 18, and is a path through which a mixture M7 of the subdivided body M6 and the resin P1 passes.

The resin supply unit 171 is coupled in the middle of the pipe 172. The resin supply unit 171 has a screw feeder 174. By the rotational drive of the screw feeder 174, the resin P1 can be supplied to the pipe 172 as powder or particles. The resin P1 supplied to the pipe 172 is mixed with the subdivided body M6 to become the mixture M7.

The resin P1 binds the fibers together in a later step. For example, a thermoplastic resin, a curable resin, and the like can be used, but a thermoplastic resin is preferably used. Examples of thermoplastic resin include AS resin; ABS resin; polyolefin such as polyethylene, polypropylene, and ethylene-vinyl acetate copolymer (EVA); modified polyolefin; acrylic resin such as polymethyl methacrylate; polyester such as polyvinyl chloride, polystyrene, polyethylene terephthalate, and polybutylene terephthalate; polyamide (nylon) such as nylon 6, nylon 46, nylon 66, nylon 610, nylon 612, nylon 11, nylon 12, nylon 6-12, and nylon 6-66; polyphenylene ether; polyacetal; polyether; polyphenylene oxide; polyether ether ketone; polycarbonate; polyphenylene sulfide; thermoplastic polyimide, polyether imide; liquid crystal polymer such as aromatic polyester; and various thermoplastic elastomers such as styrene-based elastomer, polyolefin-based elastomer, polyvinyl chloride-based elastomer, polyurethane-based elastomer, polyester-based elastomer, polyamide-based elastomer, polybutadiene-based elastomer, trans-polyisoprene-based elastomer, fluororubber-based elastomer, and chlorinated polyethylene-based elastomer. One or more of these materials may be used independently or in combination. Preferably, as the thermoplastic resin, polyester or one containing the same is used.

What is supplied from the resin supply unit 171 may include, for example, a colorant for coloring the fiber, an aggregation inhibitor for suppressing aggregation of the fiber and resin P1, a flame retardant for making fibers hard to burn, a paper strength enhancer for enhancing the paper strength of sheet S, and the like in addition to the resin P1. A combination of these components previously contained in the resin P1 may be supplied from the resin supply unit 171.

In the middle of the pipe 172, the blower 173 is installed downstream from the resin supply unit 171. The subdivided body M6 and the resin P1 are mixed by the action of the rotating portion such as a blade of the blower 173. Moreover, the blower 173 can generate airflow toward the loosening unit 18. With this airflow, the subdivided body M6 and the resin P1 can be stirred in the pipe 172. Thereby, the mixture M7 can flow into the loosening unit 18 in a state where the subdivided body M6 and the resin P1 are uniformly dispersed. Moreover, the subdivided body M6 in the mixture M7 is loosened in the process of passing through the pipe 172 and becomes finer fibrous.

The loosening unit 18 is a portion that performs a loosening process of loosening fibers intertwined in the mixture M7. The loosening unit 18 has the drum unit 181 and the housing unit 182 that houses the drum unit 181.

The drum unit 181 is a sieve that is formed of a cylindrical mesh body and rotates about its central axis. The mixture M7 flows into the drum unit 181. Then, when the drum unit 181 rotates, fibers and the like smaller than the mesh opening of the mixture M7 can pass through the drum unit 181. At this time, the mixture M7 is loosened.

The housing unit 182 is coupled to the humidifying unit 234. The humidifying unit 234 is configured of a vaporizing humidifier similar to the humidifying unit 231. Thereby, humidified air is supplied into the housing unit 182. The humidified air can humidify the inside of the housing unit 182, and thereby, it is possible to suppress the mixture M7 from adhering to the inner wall of the housing unit 182 due to electrostatic force.

The mixture M7 loosened in the drum unit 181 falls while being dispersed in the air, and travels to a second web forming unit 19 located below the drum unit 181. The second web forming unit 19 is a portion that performs a second web forming process of forming a second web M8 from the mixture M7. The second web forming unit 19 has the mesh belt 191, a stretching roller 192, and the suction unit 193.

The mesh belt 191 is an endless belt on which the mixture M7 is deposited. The mesh belt 191 is wound around four stretching rollers 192. Then, the mixture M7 on the mesh belt 191 is transported downstream by the rotational drive of the stretching roller 192.

Most of the mixture M7 on the mesh belt 191 has a size larger than the mesh opening of the mesh belt 191. Thereby, the mixture M7 is restricted from passing through the mesh belt 191 and can therefore be deposited on the mesh belt 191. Moreover, since the mixture M7 is deposited on the mesh belt 191 and transported downstream with the mesh belt 191, it is formed as a linear second web M8.

The suction unit 193 is a suction mechanism that sucks air from below the mesh belt 191. Thereby, the mixture M7 can be sucked on to the mesh belt 191, and the deposition of the mixture M7 on the mesh belt 191 is promoted.

A pipe 246 is coupled to the suction unit 193. Moreover, the blower 263 is installed in the middle of the pipe 246. By the operation of the blower 263, a suction force can be generated in the suction unit 193.

The humidifying unit 236 is disposed at the downstream of the loosening unit 18. The humidifying unit 236 is configured of an ultrasonic humidifier similar to the humidifying unit 235. Thereby, moisture can be supplied to the second web M8, and the moisture content of the second web M8 is adjusted. By the adjustment, the adsorption of the second web M8 to the mesh belt 191 due to electrostatic force can be suppressed. Thereby, the second web M8 is easily peeled off from the mesh belt 191 at a position where the mesh belt 191 is folded back by the stretching roller 192.

The total moisture content added to the humidifying units 231 to the humidifying unit 236 is preferably 0.5 parts by mass or more and 20 parts by mass or less with respect to 100 parts by mass of the material before humidification, for example.

The sheet forming unit 20 is disposed at the downstream of the second web forming unit 19. The sheet forming unit 20 is a portion that performs a sheet forming process of forming the sheet S from the second web M8. The sheet forming unit 20 has a pressurizing unit 201 and a heating unit 202.

The pressurizing unit 201 has a pair of calender rollers 203 and can press the second web M8 between the calender rollers 203 without heating. Thereby, the density of the second web M8 is increased. The degree of heating at this time is preferably, for example, a degree that the resin P1 is not melted. Then, the second web M8 is transported toward the heating unit 202. One of the pair of calender rollers 203 is a main driving roller driven by the operation of a motor (not shown), and the other is a driven roller.

The heating unit 202 has a pair of heating rollers 204 and can apply pressure while heating the second web M8 between the heating rollers 204. By the heating and pressing, in the second web M8, the resin P1 is melted and the fibers are bound together via the melted resin P1. Thereby, the sheet S is formed. Then, the sheet S is transported toward the cutting unit 21. One of the pair of heating rollers 204 is a main driving roller driven by the operation of a motor (not shown), and the other is a driven roller.

The cutting unit 21 is disposed at the downstream of the sheet forming unit 20. The cutting unit 21 is a portion that performs a cutting process of cutting the sheet S. The cutting unit 21 has a first cutting unit 211 and a second cutting unit 212.

The first cutting unit 211 cuts the sheet S in a direction that intersects the transport direction of the sheet S, in particular, a direction that is orthogonal.

The second cutting unit 212 cuts the sheet S in a direction parallel to the transport direction of the sheet S at the downstream of the first cutting unit 211. This cutting is to remove unnecessary portions at both end portions, that is, the end portions in the +y axis direction and the −y axis direction of the sheet S and to adjust the width of the sheet S. The cut and removed portion is called "edge".

As shown in FIG. 3, the second cutting unit 212 has a first cutter unit 213 that cuts an end portion of the sheet S in the +Y axis direction and a second cutter unit 214 that cuts the end portion of the sheet S in the −Y axis direction. The first cutter unit 213 and the second cutter unit 214 are spaced apart in this order from the +Y axis side. Since the first cutter unit 213 and the second cutter unit 214 have the same configuration, the first cutter unit 213 will be representatively described below.

The first cutter unit 213 has two rotary blades 215. Rotary blades 215 are arranged side by side along the z axis via a transport path of the sheet S. Moreover, each rotary blade 215 has a disk shape, and the thickness direction is disposed in a direction along the +y axis direction. The outer edge portion of the rotary blade 215 has a sharp edge and can cut the sheet S along the x axis direction when passing between the rotary blades 215. Thereby, the edge, that is, the sheet S1 is formed.

By the second cutting unit 212, the both end portions of the sheet S are cut to form two long sheets S1 per sheet S. Since the sheet S1 is formed by being cut in a state where tension is applied to the sheet S by the second cutting unit 212, the sheet S has a shape that is curved in the thickness direction and has bending. Furthermore, as shown in FIG. 2, since one end of the sheet S1 is held by the second cutter unit 214, the sheet S1 has a shape further bent in the thickness direction due to gravity. When the two sheets S1 are cut, they fall as they are toward the collection unit 10.

The second cutting unit 212 and the hopper 3 described later constitute a cutting process device 1 of the present disclosure.

With such a cutting unit 21, a sheet S having a desired shape and size can be obtained. Then, the sheet S is further transported downstream and accumulated in the stock unit 22.

Each unit included in the sheet manufacturing apparatus 100 described above is electrically coupled to the control unit 28. The operations of these unit are controlled by the control unit 28.

The control unit 28 has a central processing unit (CPU) 281 and a storage unit 282. For example, the CPU 281 can perform various determinations and various instructions.

The storage unit 282 stores various programs such as a program for manufacturing a sheet S, for example.

The control unit 28 may be incorporated in the sheet manufacturing apparatus 100, or may be provided in an external device such as an external computer. For example, the external device may communicate with the sheet manufacturing apparatus 100 via a cable or the like or may be coupled to the sheet manufacturing apparatus 100 via a network such as the Internet in the case of wireless communication.

The CPU 281 and the storage unit 282 may be integrated into a single unit. The CPU 281 may be incorporated in the sheet manufacturing apparatus 100, and the storage unit 282 may be provided in an external device such as an external computer. The storage unit 282 may be incorporated in the sheet manufacturing apparatus 100, and the CPU 281 may be provided in an external device such as an external computer.

Next, the collection unit 10 will be described.

As shown in FIGS. 1 to 3, the collection unit 10 has a function of collecting the sheet S1 cut from the sheet S and circulating it to the defibrating unit 13. The collection unit 10 includes the hopper 3 of the present disclosure, a crushing unit 4, and a circulation path 5. Since the sheet S1 is cut and formed in a state where tension is applied to the sheet S, the sheet 1 has a non-flat shape, that is, a shape curved in the thickness direction and has bending. The curvature radius is approximately 50 mm or more and 150 mm or less. The aspect ratio of the sheet S1, that is, the long side/short side is preferably 10 or more and 30 or less.

As shown in FIGS. 2 and 3, the hopper 3 has a receiving member 31 and a discharge unit 32. The receiving member 31 has a pair of guide plates 311 consisting of a first side wall and a second side wall and a pair of side walls 312 consisting of a third side wall and a fourth side wall, and has a cylindrical shape in which end portions thereof are coupled to each other. An upper opening portion of the receiving member 31 functions as a supply port through which the sheet S1 is supplied, and a lower opening functions as a discharge port 313. The discharge port 313 is provided on the other side such that the first side wall is inclined, and the distance between the first side wall and the second side wall is shorter than the upper opening portion of the receiving member 31.

As shown in FIG. 3, the guide plates 311 are arranged side by side along the y axis direction and are disposed inclined with respect to the z axis so that the separation distance becomes smaller toward the −z axis side. As shown in FIG. 2, each side wall 312 is disposed so as to face the x axis direction, and the thickness direction thereof is disposed in the direction along the x axis direction.

The receiving member 31 has a cross section, that is, a cross section along the xy plane, and the inner portion has a rectangular shape whose longitudinal direction is the x axis direction, and the width thereof becomes smaller toward the −z axis.

The receiving member 31 has the discharge port 313 communicating with the discharge unit 32 at the end portion of the −z axis. That is, the discharge port 313 is formed by the end portions of the pair of guide plates 311 and the pair of side walls 312 on the −z axis.

The falling sheet S1 is collected by the receiving member 31, and the sheet S1 is directed toward the discharge unit 32 via the discharge port 313.

The discharge unit 32 has a housing 321 that forms a flow path which couples the discharge port 313 of the receiving member 31 with the circulation path 5. The housing 321 has a long box shape extending along the x axis direction, and the circulation path 5 is coupled to the side wall thereof on the −x axis side.

The crushing unit 4 is provided in the housing 321. The crushing unit 4 has a pair of crushing blades 41. The crushing blade 41 has a cylindrical shape extending in the x axis direction, and a blade is formed on the outer peripheral portion thereof. The crushing blades 41 are arranged side by side along the y axis direction. As shown in FIG. 3, the crushing blades 41 rotate in the opposite direction to each other so that the sheet S1 therebetween can be crushed, that is, cut into coarse debris S2. Like the coarse debris M2 described above, the shape and size of the coarse debris S2 are preferably suitable for the defibrating process in the defibrating unit 13. For example, a small piece having a side length 100 mm or less is preferable, and a small piece having a length of 10 mm or more and 70 mm or less is more preferable.

The coarse debris S2 formed by such a crushing unit 4 is supplied to the defibrating unit 13 via the circulation path 5. As shown in FIGS. 1 and 2, the circulation path 5 has a pipe 51 and a blower 52 provided in the pipe 51. The pipe 51 has one end portion coupled to the housing 321 and the other end portion coupled to the pipe 241. The coarse debris S2 in the housing 321 is sucked into the pipe 51 by the operation of the blower 52 and is sent out to the pipe 241. Then, the coarse debris S2 is supplied to the defibrating unit 13 again. Accordingly, the sheet S1, which is a waste generated by cutting the sheet S, can be reused, and the yield can be increased.

The hopper 3 has an effective configuration of preventing or suppressing the sheet S1 from being clogged in the discharge port 313 and discharging the sheet S smoothly. This will be described below.

As shown in FIG. 4, each guide plate 311 is provided with a posture adjusting unit 6 on the +z axis side of the surfaces facing each other and near the corner on +x axis side. Since each receiving member 31 has a mirror image relationship with respect to the y axis and has the same shape and action, +y side guide plate 311 will be described below.

FIG. 4 is a plan view of the +y side guide plate 311 and is a plan view viewed from the side of each guide plate 311 facing each other. Hereinafter, in the plan view, the corner on the +z axis side and the −x axis side of the guide plate 311 is referred to as a corner A, the corner on the −z axis side and the −x axis side is referred to as a corner B, the corner on the +z axis side and the +x axis side is referred to as a corner C, and the corner on the −z axis side and the +x axis side is referred to as a corner D. The edge portion between the corner A and the corner B is referred to as an edge portion a, the edge portion between the corner B and the corner D is referred to as an edge portion b, the edge portion between the corner C and the corner D is referred to as an edge portion c, and the edge portion between the corner A and the corner C is referred to as an edge portion d. The corner A, the corner B, the corner C, and the corner D may be rounded, and can also be referred to as a corner portion A, a corner portion B, a corner portion C, and a corner portion D.

The guide plate 311 is formed by bending two different position near the corner C, that is, by bending. One folding line E is a ridge line formed from the edge portion d to the edge portion c. The other folding line F is a valley line formed from the edge portion d to the edge portion c. In the folding line F, an end portion f1 on the edge portion d side is located on the +x axis side from an end portion e1 of the edge portion d side of the folding line E. An end portion e2 on the edge portion c of the folding line E and an end portion f2 of the edge portion c of the folding line F are at the same position.

Because of such a configuration, the guide plate 311 has three planes of a first surface 311A, a second surface 311B, and a third surface 311C. The first surface 311A is a portion surrounded by a portion of the edge portion a, the edge portion b, and the edge portion c from the corner D to the end portion e2 of the folding line E, a portion of the edge portion d from the corner A to the end portion e1 of the folding line E, and the folding line E. The second surface 311B is a portion surrounded by the folding line E, the folding line F, and a portion of the edge portion d between the end portion e1 and the end portion f1. The third surface 311C is a portion surrounded by a portion of the edge portion d between the corner C and the end portion f1, a portion of the edge portion c between the corner C and the end portion f2, and the folding line F.

Since the folding line E is a ridge line, the second surface 311B is inclined from the folding line E toward the deep side of the paper in FIG. 4. Moreover, the folding line E and the folding line F have opposite bending directions, and the third surface 311C is parallel to the first surface 311A.

The folding line E which is a ridge line and the folding line F which is a valley line are inclined with respect to the edge portion b which is an end portion of the first surface 311A on the discharge unit 32 side in plan view of the first surface 311A that is a guide surface. For this reason, the second surface 311B has an elongated shape along the folding line E and the folding line F, and is inclined with respect to the edge portion b in plan view of the first surface 311A.

When the inclination angle of the folding line E which is a ridge line with respect to the edge portion b is θ1, and the inclination angle of the folding line F which is a valley line with respect to the edge portion b is θ2, θ1<θ2 is satisfied. For this reason, the second surface 311B is a long triangle extending along the folding line E and the folding line F. That is, the width of the second surface 311B gradually decreases toward the −z axis side, that is, as it approaches the discharge unit 32.

θ1 is preferably 45° or more and 70° or less, and more preferably 45° or more and 60° or less. Thereby, the effect of the present disclosure can be obtained more significantly.

θ2-θ1 is preferably 2° or more and 10° or less, and more preferably 2° or more and 5° or less. Thereby, the effect of the present disclosure can be obtained more significantly.

At the folding line E, the bending angle on the end portion e1 side is larger than the bending angle on the end portion e2 side. At the folding line F, the bending angle on the end portion f1 side is larger than the bending angle on the end portion f2 side. Due to such a configuration, the inclination angle of the second surface 311B with respect to the first surface 311A decreases as it approaches the edge portion c, in other words, as it approaches the −z axis side.

As shown in FIG. 3, such a hopper 3 is installed at a position where the second surface 311B abuts on the end portion of the sheet S1 which is cut and dropped. In the present embodiment, the hopper 3 is provided at the cutting position of the sheet S1, that is, on the −z axis side of the cutting edge of the rotary blade 215. As shown in FIG. 4, when the sheet S1 falls, the +x axis side end portion of the sheet S1 abuts on a portion of the second surface 311B on the −x axis side, that is, a relatively wide portion of the second surface 311B. This state is shown as state (i) in FIGS. 4 and 5.

The sheet S1 is cut from the +x axis side end portion and falls first. In the state (i), the +x axis side end portion is located on the −z axis side from the −x axis side end portion.

The sheet S1 falls from the state (i) as shown in the state (ii) while sliding on the second surface 311B along the longitudinal direction of the second surface 311B. When the sheet S1 falls while sliding on the second surface 311B, the falling speed of the −x axis side end portion in the z axis direction is faster than the falling speed of the +x axis side end portion in the z axis direction. This is because the +x axis side end portion of the sheet S1 is guided obliquely with respect to the z axis and does not fall along the z axis. Then, as shown in the state (iii), when the sheet S1 falls near the edge portion c of the second surface 311B, in the sheet S1, the −x axis side end portion catches up with the +x axis side the end portion and becomes substantially the same height. That is, the sheet S1 has a posture in which the longitudinal direction thereof is substantially along the x axis. The sheet S1 moves to the first surface 311A in this posture, is guided to the first surface 311A and dropped while being maintained in this posture, and is discharged to the discharge unit 32, as shown in the state (iv).

Here, in particular, the sheet S1 has a curved shape in one direction and falls from the +x axis side end portion first. Therefore, even if a hopper 3' in the related art as shown in FIG. 6 is simply applied to the sheet manufacturing apparatus 100, there is a possibility that the +x axis side end portion will fall first and the sheet S1 will be clogged like a bridge between two guide plates near the discharge port.

In the hopper 3 of the present disclosure, the second surface 311B functions as the posture adjusting unit 6 which adjusts the posture of the falling sheet S1 and sends out to the first surface 311A, and the first surface 311A functions as a guide surface 7 that guides the sheet S1 to the discharge unit 32 while maintaining the same posture. Thereby, when the sheet S1 passes through the discharge port 313, the longitudinal direction of the sheet S1 and the longitudinal direction of the discharge port 313 can be substantially matched, and it can pass through the discharge port 313 smoothly. Thereby, the possibility that the sheet S1 is clogged at the discharge port 313, that is, the state shown in FIG. 6 can be significantly reduced. As a result, throughput can be increased.

In the state (i) to the state (iii), the sheet S1 falls while gradually rotating about the x axis. In the (iii), the sheet S1 is twisted substantially 90°, and the thickness direction of the sheet S1 is substantially parallel to the first surface 311A. This is because, as described above, the inclination angle of the second surface 311B with respect to the first surface 311A decreases toward the edge portion c. Thereby, regardless of the width of the discharge port 313 and the width of the sheet S1, the discharge port 313 can be passed through with higher accuracy. That is, it is possible to more reliably prevent the sheet S1 from being clogged at the discharge port 313.

In the state (i) to the state (iii), when the sheet S1 rotates, the third surface 311C abuts on the sheet S1 to prevent the sheet S1 from coming out of the hopper 3 and functions as a restriction surface that restricts the rotation direction. That is, the receiving member 31 has the third surface 311C that is provided continuously with the second surface 311B on the opposite side of the first surface 311A which is a guide surface of the second surface 311B, which is the posture adjusting surface (inclined surface) and is bent from the second surface 311B so as to form the folding line F which is a valley line at the boundary portion with the second surface 311B, and is a restriction surface that restricts the position of the falling sheet S1. Thereby, the sheet S1 can be more reliably dropped toward the discharge port 313, and the rotation direction can also be restricted. As a result, the sheet S1 can pass through the discharge port 313 with higher accuracy.

As described above, the hopper 3 of the present disclosure includes the receiving member 31 having the first surface 311A that is a guide surface for guiding the strip-shaped sheet S1 with a non-flat deflection and the second surface 311B as a posture adjusting unit that adjusts the posture of the falling sheet S1 and sends it to the first surface 311A, and the discharge unit 32 for discharging the sheet S1.

Thereby, when the sheet S1 passes through the discharge port 313, the longitudinal direction of the sheet S1 and the longitudinal direction of the discharge port 313 can be substantially matched, and it can pass through the discharge port 313 smoothly. Thereby, it is possible to prevent or suppress the sheet S1 from being clogged at the discharge port 313. As a result, throughput can be increased.

The cutting process device 1 includes the second cutting unit 212 that is a cutting unit that cuts the sheet S that is a sheet base material to from a non-flat strip-shaped sheet S1 and the hopper 3. The hopper 3 is installed at a position where the sheet S1 formed by the second cutting unit 212 falls and one end portion of the fallen sheet S1 abuts on the second surface 311B which is the posture adjusting unit 6. Thereby, the cutting process device 1 having the advantages of the above-described hopper 3 can be obtained.

The posture adjusting unit 6 has the second surface 311B that is continuous with the first surface 311A which is a guide surface and is the posture adjusting surface bent from the first surface 311A so as to form the folding line E which is a ridge line at the boundary portion with respect to the first surface 311A. Thereby, when the sheet S1 passes through the discharge port 313, the longitudinal direction of the sheet S1 and the longitudinal direction of the discharge port 313 can be substantially matched, and it can pass through the discharge port 313 smoothly.

The second surface 311B which is the posture adjusting surface, has a long shape, and its width gradually decreases toward the −z axis side, that is, it approaches the discharge unit 32. For this reason, in the state (i) to the state (iii), the sheet S1 can be dropped while gradually rotating about the x axis. As a result, the discharge port 313 can be passed through with higher accuracy. The second surface 311B, which is the posture adjusting surface, is inclined to the −Z axis side on the −Y axis side than on the +Y axis side. More preferably, the −Y axis side is preferably vertically downward with respect to the horizontal plane when the +Y axis side is used as a reference. Thereby, the sheet S1 can be prevented from staying on the second surface 311B and can be guided to the discharge unit 32.

Second Embodiment

Figure 7:
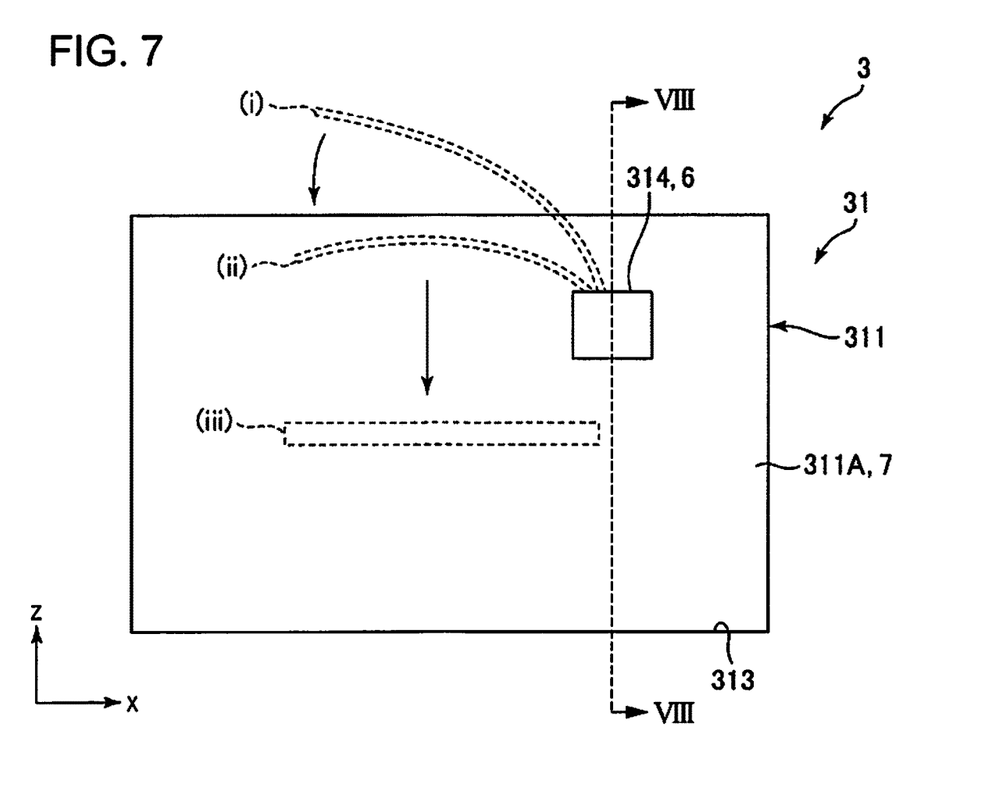
FIG. 7 is a plan view of a guide plate provided in a second embodiment of the hopper of the present disclosure.
Figure 8:
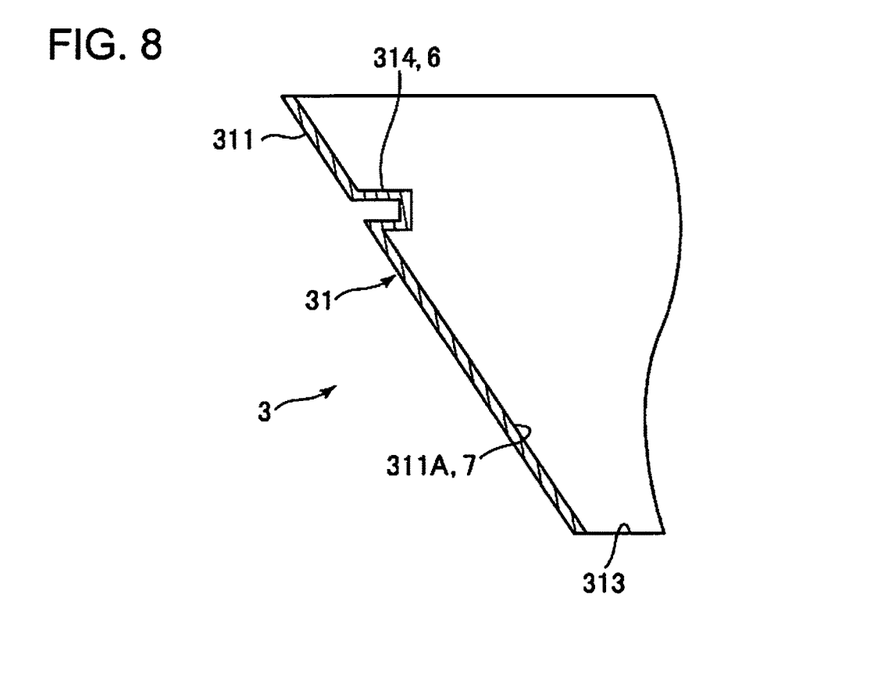
FIG. 8 is a cross-sectional view taken along line VIII-VIII in FIG. 7.

FIG. 7 is a plan view of a guide plate provided in a second embodiment of the hopper of the present disclosure. FIG. 8 is a cross-sectional view taken along line VIII-VIII in FIG. 7.

Hereinafter, the second embodiment of the hopper and the cutting process device of the present disclosure will be described with reference to FIGS. 7 and 8. Differences from the above-described embodiment will be mainly described, and description of similar matters will be omitted.

The present embodiment is the same as the first embodiment except that the configuration of the posture adjusting unit is different.

As shown in FIGS. 7 and 8, in the present embodiment, the guide plate 311 has a convex portion 314 protruding in a prismatic shape toward the inside. That is, the convex portion 314 forms a step on a plane including the first surface 311A which is a guide surface. Although not shown, the hopper 3 is installed at a position where the convex portion 314 abuts on the +x axis side end portion of the cut and fallen sheet S1.

According to the present embodiment as shown in FIG. 7, as shown in the state (i), the +x axis side end portion of the fallen sheet S1 abuts on the convex portion 314 and the +x axis side end portion stays temporarily. As shown in the state (iii), the sheet S1 rotates about the abutting point, and the height of the −x axis side end portion is substantially the same as the height of the +x axis side end portion. As shown in the state (iii), the sheet S1 falls while gradually rotating about the x axis in accordance with the inclination of the first surface 311A. In this way, the convex portion 314 functions as the posture adjusting unit 6. Thereby, when the sheet S1 passes through the discharge port 313, the longitudinal direction of the sheet S1 and the longitudinal direction of the discharge port 313 can be substantially matched, and it can pass through the discharge port 313 smoothly. Thereby, it is possible to prevent the sheet S1 from being clogged at the discharge port 313.

In the present embodiment, the convex portion 314 forms a step on the first surface 311A. However, the present disclosure is not limited to this, and it may be a concave portion provided in the guide plate 311 and recessed toward the outside. Thereby, a step is formed on the first surface 311A, and the end portion of the sheet S1 is temporarily caught by the step, and thereby the same effect as described above can be obtained.

Third Embodiment

Figure 9:
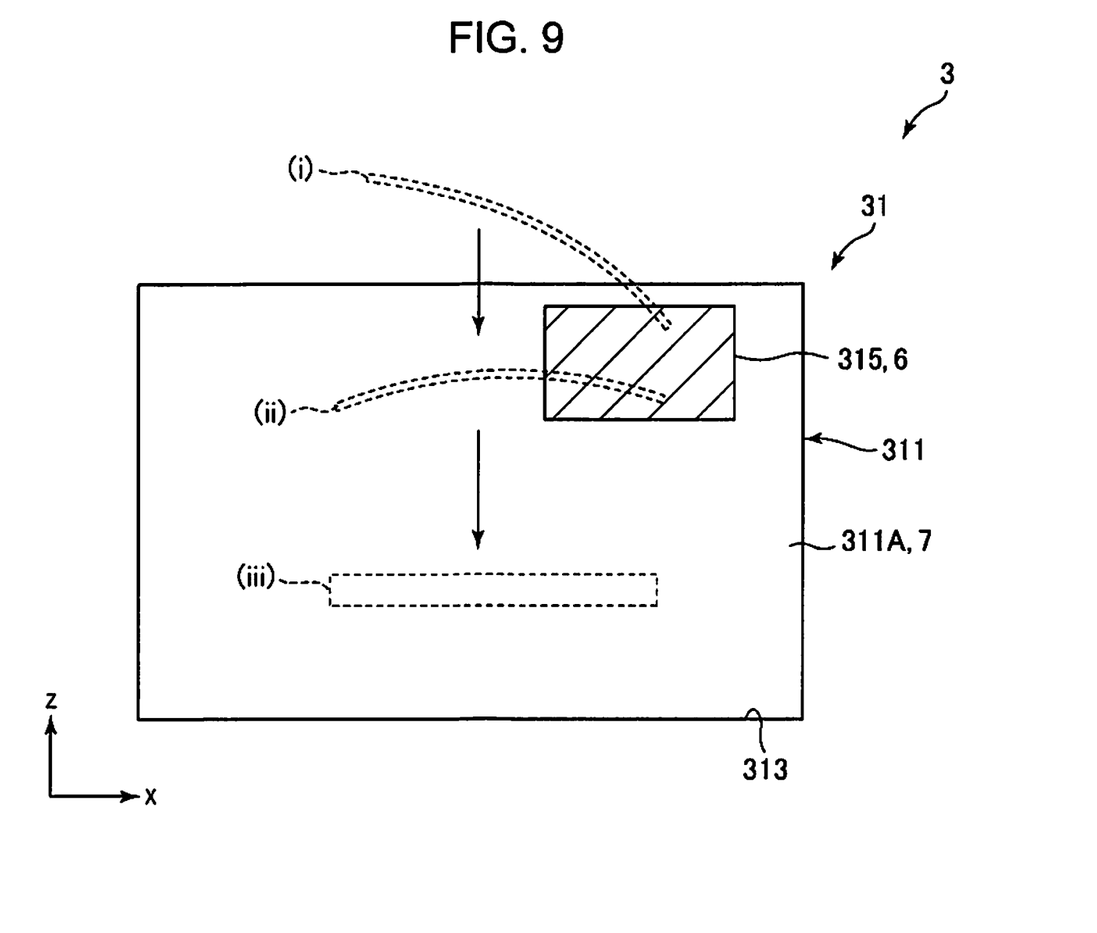
FIG. 9 is a plan view of a guide plate provided in a third embodiment of the hopper of the present disclosure.

FIG. 9 is a plan view of a guide plate provided in a third embodiment of the hopper of the present disclosure.

Hereinafter, the third embodiment of the hopper and the cutting process device of the present disclosure will be described with reference to FIG. 9. Differences from the above-described embodiments will be mainly described, and description of similar matters will be omitted.

The present embodiment is the same as the first embodiment except that the configuration of the posture adjusting unit is different.

As shown in FIG. 9, in the present embodiment, the guide plate 311 includes a frictional resistance increasing portion 315 having a larger surface friction coefficient than the first surface 311A. The frictional resistance increasing portion 315 functions as the posture adjusting unit 6. The frictional resistance increasing portion 315 only needs to have the surface friction coefficient larger than that of the first surface 311A. For example, a configuration in which a sheet made of a rubber material is attached to the inner surface of the guide plate 311 or a configuration in which the surface roughness is rougher than the surroundings can be adopted.

Although not shown, the hopper 3 is installed at a position where the frictional resistance increasing portion 315 abuts on the +x axis side end portion of the cut and falling sheet S1.

According to the present embodiment as shown in FIG. 9, as shown in the state (i), the +x axis side end portion of the fallen sheet S1 abuts on the frictional resistance increasing portion 315 and the falling speed of the +x axis side end portion becomes slower. Then, as shown in the state (ii), the −x axis side end portion of the sheet S1 falls while being guided by the first surface 311A, and the height of the −x axis side end portion is substantially the same as the height of the +x axis side end portion. As shown in the state (iii), the sheet S1 falls while gradually rotating about the x axis in accordance with the inclination of the first surface 311A. Thereby, when the sheet S1 passes through the discharge port 313, the longitudinal direction of the sheet S1 and the longitudinal direction of the discharge port 313 can be substantially matched, and it can pass through the discharge port 313 smoothly. Thereby, it is possible to prevent the sheet S1 from being clogged at the discharge port 313.

The frictional resistance increasing portion 315 can also be provided with the second surface 311B described in the first embodiment. Thereby, the synergistic effect of the effect of the first embodiment and the effect of the third embodiment can be exhibited, and the sheet S1 can be more reliably prevented from being clogged at the discharge port 313.

As described above, the hopper and the cutting process device of the present disclosure are described with respect to the illustrated embodiments. However, the present disclosure is not limited to this, and each portion which constitutes the hopper and the cutting process device can be replaced with any component that can exhibit the same function. Moreover, any components may be added.

The hopper and the cutting process device of the present disclosure may be a combination of any two or more configurations and features of the above-described embodiments.

What is claimed is:

1. A hopper comprising:
a receiving member having a guide surface that guides a non-flat strip-shaped sheet and a posture adjusting unit that adjusts a posture of the sheet and sends the sheet to the guide surface; and
a discharge unit that discharges the sheet,
the posture adjusting unit having a posture adjusting surface that is continuous with the guide surface and is bent from the guide surface so as to form a ridge line at a boundary portion with the guide surface.

2. The hopper according to claim 1, wherein
the ridge line is inclined with respect to an end portion of the guide surface on a side of the discharge unit in plan view of the guide surface.

3. The hopper according to claim 1, wherein
the posture adjusting surface has a length that is longer than a width of the posture adjusting surface.

4. The hopper according to claim 3, wherein
the posture adjusting surface decreases in width toward the discharge unit.

5. The hopper according to claim 1, wherein
the receiving member has a restriction surface provided continuously with the posture adjusting surface on a side of the posture adjusting surface opposite to the guide surface being bent from the posture adjusting surface so as to form a valley line at a boundary portion with the posture adjusting surface, and restricting a position of the sheet.

6. The hopper according to claim 5, wherein
the valley line is inclined with respect to an end portion of the guide surface on a side of the discharge unit in plan view of guide surface.

7. The hopper according to claim 6, wherein
when an inclination angle of the ridge line with respect to the end portion is θ1 and an inclination angle of the valley line with respect to the end portion is θ2, θ1<θ2 is satisfied.

8. A cutting process device comprising:
a cutting unit that cuts a sheet base material to form a non-flat strip-shaped sheet; and
a hopper including
a receiving member having a guide surface that guides the sheet and a posture adjusting unit that adjusts a posture of the sheet and sends the sheet to the guide surface, and
a discharge unit that discharges the sheet, wherein
the hopper is installed at a position in which the sheet formed by the cutting unit falls and one end portion of the sheet abuts on the posture adjusting unit.

* * * * *